United States Patent
Platiau

(10) Patent No.: US 9,212,006 B1
(45) Date of Patent: Dec. 15, 2015

(54) CONVEYOR WITH BELT-ACTUATED GUIDE

(71) Applicant: Laitram, L.L.C., Harahan, LA (US)

(72) Inventor: Benoit Platiau, Utrecht (NL)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/607,891

(22) Filed: Jan. 28, 2015

(51) Int. Cl.
*B65G 47/46* (2006.01)
*B65G 37/00* (2006.01)

(52) U.S. Cl.
CPC .............. *B65G 37/00* (2013.01); *B65G 47/46* (2013.01)

(58) Field of Classification Search
CPC .... B65G 2201/02; B65G 17/24; B65G 47/71; B65G 47/34; B65G 47/46; B65G 47/648; B65G 13/02; B65G 13/04
USPC .............................. 198/370.08, 370.09, 370.1
See application file for complete search history.

(56) References Cited

U.S. PATENT DOCUMENTS

| | | | |
|---|---|---|---|
| 1,729,671 A | 10/1929 | Bell-Irving et al. | |
| 3,093,236 A | 6/1963 | McLaughlin | |
| 3,104,755 A | 9/1963 | Zuercher | |
| 3,550,756 A | 12/1970 | Kornylak | |
| 3,578,141 A | 5/1971 | Sheehan | |
| 3,934,706 A | 1/1976 | Tice | |
| 4,298,117 A | 11/1981 | Kobayashi et al. | |
| 4,850,471 A * | 7/1989 | Annas et al. ................ | 198/349.3 |
| 5,423,409 A * | 6/1995 | Wipf ............................. | 198/367 |
| 5,655,643 A | 8/1997 | Bonnet | |
| 5,988,356 A * | 11/1999 | Bonnet .................... | 198/370.08 |
| 6,079,544 A | 6/2000 | Donati et al. | |
| 6,607,065 B2 | 8/2003 | Peppel | |
| 7,124,876 B2 | 10/2006 | Wolf | |
| 7,147,097 B2 | 12/2006 | Lemm | |
| 7,506,745 B1 * | 3/2009 | McGuire et al. ......... | 198/457.03 |
| 7,992,701 B2 | 8/2011 | Wolf | |
| 8,210,341 B2 | 7/2012 | Marshall et al. | |
| 8,312,980 B2 * | 11/2012 | Wilson et al. ............ | 198/370.07 |
| 8,701,867 B2 | 4/2014 | Costanzo et al. | |
| 2004/0094388 A1 * | 5/2004 | Van Liempd et al. .... | 198/370.08 |
| 2008/0121495 A1 | 5/2008 | Pressler | |

* cited by examiner

*Primary Examiner* — James R Bidwell
(74) *Attorney, Agent, or Firm* — James T. Cronvich

(57) ABSTRACT

An article guide for a belt conveyor with belt-actuated guide walls. The guide is supported atop the conveyor belt on wheels that ride on the conveyor belt. At least one of the wheels is a drive wheel engaging one or more pushers that push conveyed articles along the belt's conveying surface. The pushers may be rollers rotated by or belts advanced by the drive wheel. The pushers form a moving vertical side wall of the guide.

31 Claims, 4 Drawing Sheets

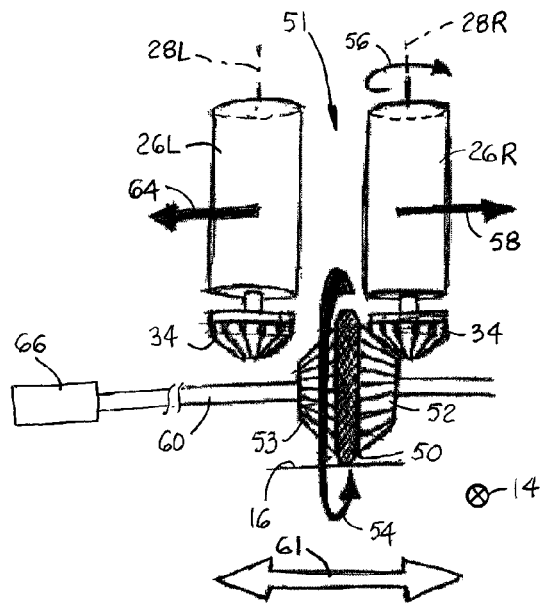
FIG. 7
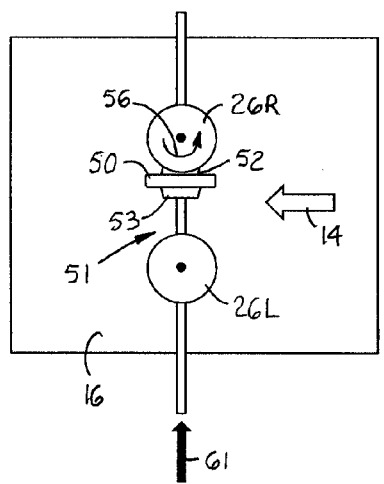 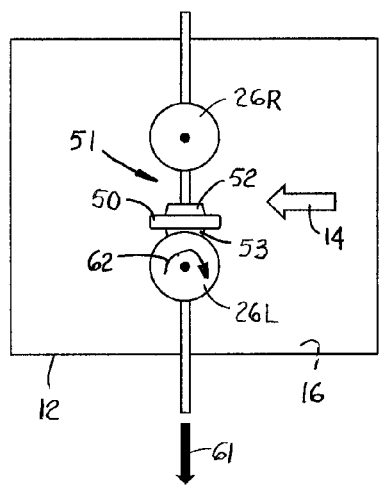
FIG. 8A                FIG. 8B

CONVEYOR WITH BELT-ACTUATED GUIDE

BACKGROUND

The invention relates generally to power-driven conveyors and more particularly to belt conveyors with guides having side walls that push conveyed articles.

Many conveyor applications require that conveyed articles be diverted laterally across or off the side of a conveyor belt. Fixed-position ejectors, tilt trays, and shoe sorters perform that function, but are noisy and can be expensive. Roller belts with article-supporting rollers freely rotatable on axes oblique to the direction of belt travel are used with a diverter bar extending across the belt to block the articles from advancing farther with the belt. The blocked articles cause the oblique rollers to rotate and push the blocked articles along the diverter bar and laterally across the belt. But roller belts are more expensive than typical conveyor belts without rollers.

Some conveyor applications require a side rail against which articles are registered. Typically, those side rails are static rails affixed to the conveyor frame. Friction between the articles being conveyed and the stationary side rails can cause the articles to rotate or can mar the sides of the articles.

SUMMARY

A conveyor embodying features of the invention comprises a conveyor belt having an upper conveying surface for conveying articles in a direction of belt travel and a guide. The guide includes a frame with wheels extending below the bottom of the frame for rotation about axes parallel to the conveying surface of the conveyor belt. At least one of the wheels is a drive wheel. The drive wheel engages and drives a pusher that forms a side of the guide. The wheels ride on the conveying surface of the conveyor belt to support the frame and rotate as the conveyor belt advances. The rotation of the drive wheel actuates the pusher to push conveyed articles along the conveying surface.

In another aspect of the invention, a guide for articles conveyed on a conveyor belt comprises a frame having wheels that extending below the bottom of the frame. At least one of the wheels is a drive wheel. The drive wheel engages and drives a pusher that forms a side of the guide. The wheels are adapted to ride on the conveying surface of a conveyor belt to support the frame and rotate as the conveyor belt advances. The rotation of the drive wheel actuates the pusher to push conveyed articles along the conveying surface of the conveyor belt.

BRIEF DESCRIPTION OF THE DRAWINGS

FIG. 7 is an enlarged view of a portion of a diverting guide as in FIG. 1 capable of bidirectional diversion of articles; and FIGS. 8A and 8B are top plan views of a portion of a conveyor showing the diverting guide of FIG. 7 in right- and left-divert positions.

DETAILED DESCRIPTION

Figure 1:
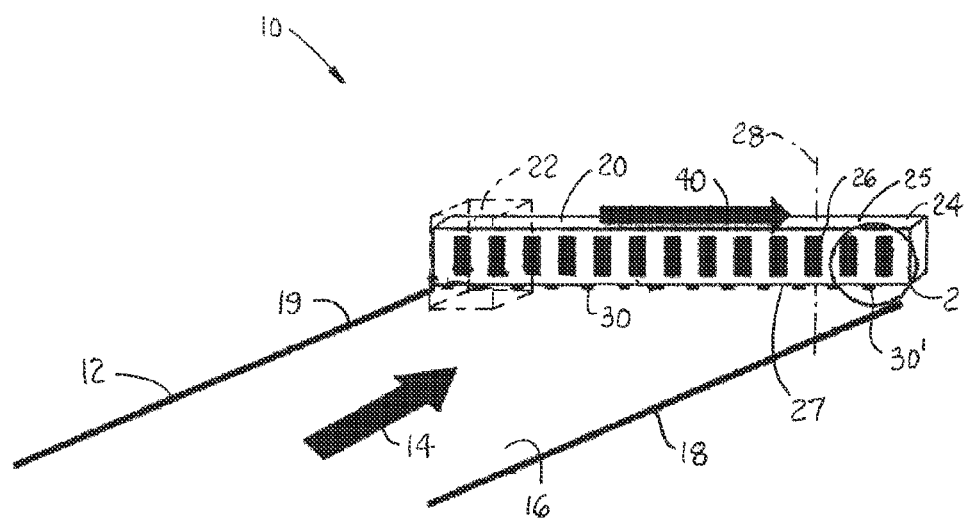
FIG. 1 is an isometric view of one version of a conveyor embodying features of the invention, including a diverting guide with pusher rollers.

FIG. 1 shows one version of a diverting conveyor embodying features of the invention. The conveyor 10 is a belt conveyor with a conveyor belt 12 advancing in a direction of belt travel 14. The conveyor belt 12 has an upper conveying surface 16 that extends from a first side 18 of the belt to a second side 19. A guide 20 disposed at a location along the conveyor carryway traverses the width of the conveyor belt 12 and intercepts articles 22 conveyed on the belt.

The guide 20 has a frame 24 that supports a row of rollers 26 arranged to rotate on parallel axes 28 that intersect the conveying surface 16 of the conveyor belt 12. The frame has a top 25 and an opposite bottom 27. In FIG. 1 the axes 28 are perpendicular to the conveying surface 16, but they could be tilted off perpendicular at an oblique angle. The peripheries of the rollers 26 extend outward of the frame 24 to form a vertical side wall of the guide 20. Conveyed articles 22 come into contact with the side wall formed by the rollers 26. For better contact with the articles, the peripheries are made of a high-friction material, such as rubber or an elastomer. The guide 20 is stationarily supported atop the conveyor belt 12 on a set of wheels 30 that extend below the bottom 27 of the frame 24 and ride on the conveying surface 16 as the belt advances in the direction of belt travel 14. At least one of the wheels 30 is a drive wheel 30' that drivingly engages the rollers 26. In the version shown in FIGS. 1 and 2, each of the wheels 30 is a drive wheel driving one of the rollers 26. In a version with fewer drive wheels than rollers, a drive train coupling multiple rollers to a drive wheel would be used. Such a drive train could include a series of meshed gears or a gang of drive belts and pulleys or a combination of both.

Figure 2:
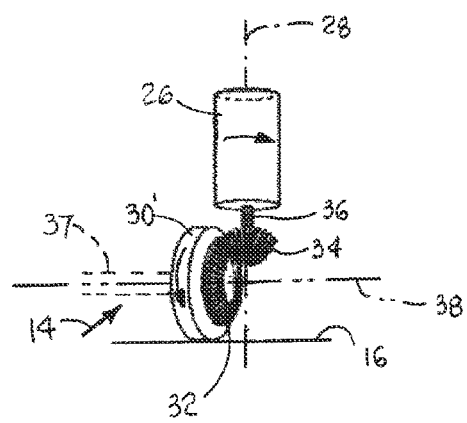
FIG. 2 is an enlarged view of the engagement of a drive wheel with a pusher roller in the conveyor of FIG. 1.
Figure 3:
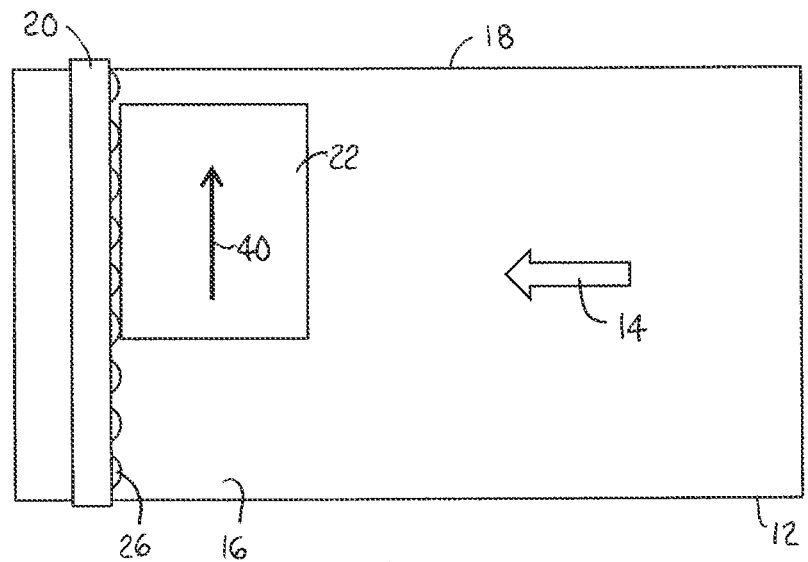
FIG. 3 is a top plan view of the conveyor of FIG. 1.

FIG. 2 shows a geared engagement of a drive wheel 30' with one of the rollers 26. (Gearless, frictional engagement is also possible.) A bevel gear 32 on a side wall of the wheel 30' engages a bevel gear 34 at the end of an axle 36 extending from the roller 26. The axle 36 defines the axis of rotation 28 of the roller. The gear ratio between the drive wheel 30' and the rollers can be set to rotate the rollers 26 at a speed less than, equal to, or greater than the speed of the conveyor belt 12. Although the axle 36 is shown with only a single roller 26, each axle could include a stack of shorter rollers spaced apart by a distance that would allow them to interleave with similarly spaced rollers on a more closely spaced adjacent axle. And all the wheels could be mounted on a common axle 37 or on individual axles. The wheel 30' has an axis of rotation 38 parallel to the plane of the conveying surface 16 of the conveyor belt and perpendicular to the direction of belt travel 14. As the wheel 30' rides on the conveying surface 16, the wheel and the roller 26 rotate in the directions of the arrows in FIG. 2. With all the rollers 26 rotating in the same direction, they push articles 22 contacting the wall of rotating rollers in a transverse direction 40 toward the first side 18 of the belt 12 as shown in FIGS. 1 and 3 against a side rail or off the side of the belt onto a discharge conveyor or chute. The guide 20 is shown perpendicular to the direction of belt travel 14 in FIG. 3, but it could be arranged at an oblique angle. Thus, the rollers 26 serve as pushers pushing articles 22 laterally across the belt 12.

Figure 4:
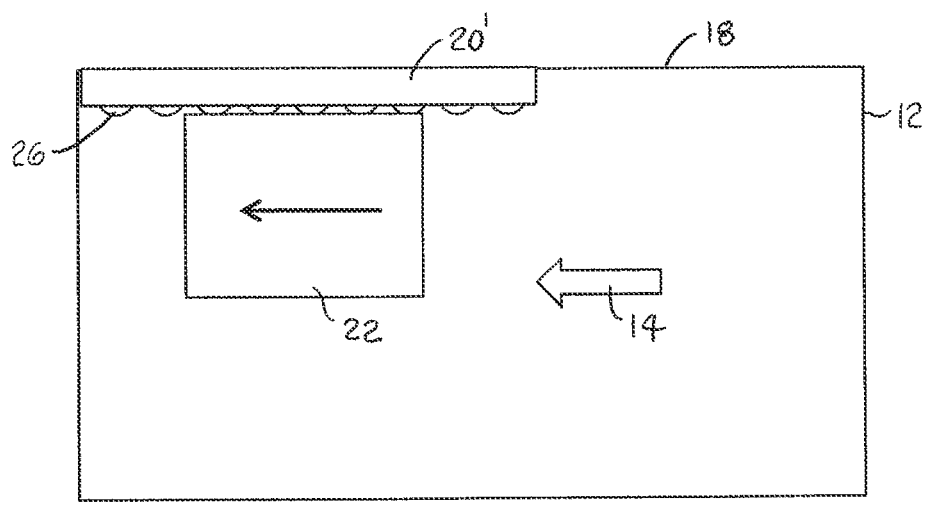
FIG. 4 is a top plan view of the conveyor of FIG. 1, but with the guide configured as a side wall.

In FIG. 4 the guide 20' extends in length along the first side 18 of the conveyor belt 12 to form a side wall against which articles 22 can be registered. The conveyor belt could be a belt with a generally flat conveying surface, or it could be a rollertop belt with obliquely oriented article-supporting belt rollers that divert articles toward the first side of the conveyor belt. The rollers 26 forming the registration surface are driven by one or more drive wheels (not shown) that are arranged to rotate on axes perpendicular to the direction of belt travel 14. This means that the wheels 30 as shown in the diverter guide 20 of FIG. 1 are rotated 90° in the side-wall guide 20' of FIG. 4. And, like the gearing of the diverter guide 20, the gearing for the side-wall guide 20' can be set to rotate the rollers and push articles 22 along the conveyor belt at speeds less than, equal to, or greater than the speed of the conveyor belt 12.

Figure 5:
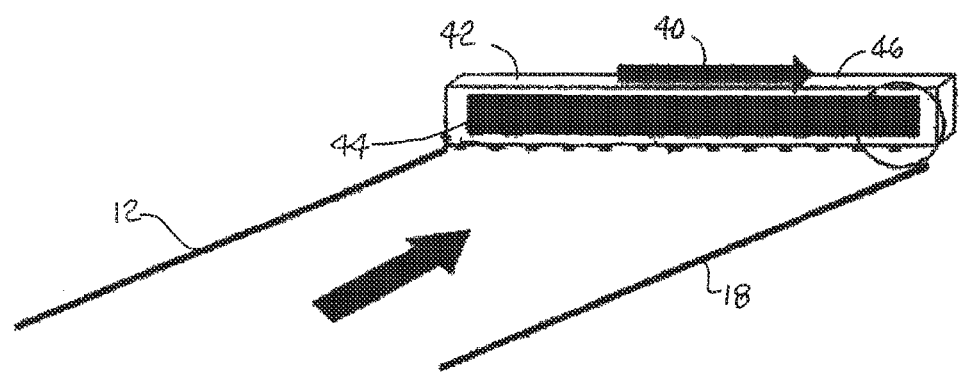
FIG. 5 is an isometric view of another version of a conveyor as in FIG. 1, but with a pusher-belt guide.
Figure 6:
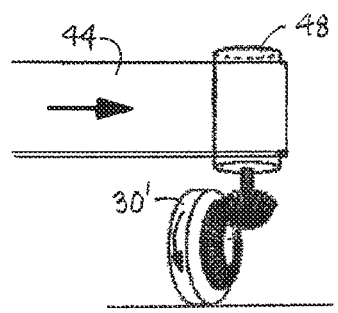
FIG. 6 is an enlarged view of the engagement of a drive wheel with a drive pulley in the conveyor of FIG. 5.

Another version of a belt-driven guide is shown in FIGS. 5 and 6. Instead of pushing articles with an array of belt-driven rollers 26 as in FIGS. 1-4, the guide 42 in FIGS. 5 and 6 uses a guide belt 44 as a pusher. The belt 44 protrudes outward of the frame 46 to form a side face of the guide 42. The guide belt 44 pushes articles toward the first side 18 of the conveyor belt 12 in the transverse direction 40 just like the roller guide 20 in FIG. 1. The belt 44 is engaged by a drive pulley 48, which is driven by a drive wheel 30' in the same way as the rollers 26 in FIG. 2. The belt 44 can be one or more toothed timing belts and the pulley a toothed pulley, or the belt can be one or more flat belts or V belts and the pulley a drum or a pulley with sheaves. The outer surface of the pusher belt 44 is made of a high-friction material for a better grip on the articles 22. And, like the guide 20 of FIG. 1, the guide 42 can be configured either as a diverter as in FIG. 5 or as an active side wall.

In FIGS. 7, 8A, and 8B the conveyor of FIG. 1 is modified to selectively divert articles either to the right or to the left. The rollers 26R and 26L have bevel gears 34 that flank a drive wheel 50, which has bevel gears 52, 53 on its opposite side walls. The drive wheel resides in a space 51 between the two consecutive rollers 26R, 26L. As shown in FIGS. 7 and 8A, when the wheel's right-side bevel gear 52 engages the bevel gear 34 of the right-side roller 26R, the wheel 50 riding on the conveying surface 16 of the conveyor belt advancing in the direction of belt travel 14 (into the sheet in FIG. 7) rotates as indicated by arrow 54. The wheel's rotation causes the right-side roller 26R to rotate about its axis 28R in the direction indicated by arrow 56, which pushes articles contacting the upstream face of the roller 26R to the right in the direction of arrow 58. The wheel 50 is mounted on a shaft 60 that can be selectively translated axially, as indicated by arrow 61, to slide the wheel from engagement with the right-side wheel 26R to engagement with the left-side wheel 26L. When the wheel 50 is translated to the left, as in FIG. 8B, its left-side bevel gear 53 meshes with the bevel gear 34 on the left-side roller 26L. The rotation of the wheel 50 riding on the conveying surface 16 of the conveyor belt 12 causes the roller 26L to rotate on its axis 28L in the opposite direction 62 of the rotation of the right-hand roller 26R when it is engaged. So the left-hand roller 26L pushes articles to the left as indicated by arrow 64. The wheel 50 can be positioned between the two rollers 26R, 26L to be disengaged from both and prevent the rollers from pushing articles. The bidirectional translation 61 of the shaft 60 can be achieved by an actuator 66, such as a linear actuator driven pneumatically, hydraulically, electromagnetically or a motor-driven screw or rack gear.

What is claimed is:

1. A conveyor comprising:
   a conveyor belt having an upper conveying surface for conveying articles in a direction of belt travel;
   a guide including:
   a frame having a top and a bottom;
   a plurality of wheels extending below the bottom of the frame for rotation about axes parallel to the conveying surface of the conveyor belt, wherein at least one of the wheels is a drive wheel;
   a pusher drivingly engaged by the drive wheel and forming a side of the guide;
   wherein the plurality of wheels ride on the conveying surface of the conveyor belt to support the frame and rotate as the conveyor belt advances and wherein the rotation of the drive wheel actuates the pusher to push conveyed articles along the conveying surface.

2. A conveyor as in claim 1 wherein all the plurality of wheels are drive wheels.

3. A conveyor as in claim 1 wherein all the plurality of wheels are mounted on a common axle.

4. A conveyor as in claim 1 wherein the conveying surface of the conveyor belt extends in width from a first side to a second side and wherein the guide extends along at least one of the first and second sides of the conveying surface to act as a side wall.

5. A conveyor as in claim 1 wherein the conveying surface of the conveyor belt extends in width from a first side to a second side and wherein the guide extends along the width of the conveying surface between the first side and the second side to intercept articles conveyed on the conveyor belt and divert them to the second side.

6. A conveyor as in claim 1 wherein the pusher comprises a plurality of rollers mounted in the frame for rotation on parallel axes that intersect the conveying surface of the conveyor belt.

7. A conveyor as in claim 6 wherein the axes of the plurality of rollers are perpendicular to the conveying surface of the conveyor belt.

8. A conveyor as in claim 6 wherein the guide includes a plurality of parallel axles, each of the axles supporting at least one of the rollers between the top and the bottom of the frame.

9. A conveyor as in claim 6 further comprising a geared engagement between the drive wheel and the plurality of rollers.

10. A conveyor as in claim 9 wherein the geared engagement has a gear ratio that causes the rollers to rotate at the point of contact with conveyed articles at a speed different from the speed of the conveyor belt in the direction of belt travel.

11. A conveyor as in claim 6 wherein the plurality of rollers have peripheries made of a high-friction rubber or elastomeric material.

12. A conveyor as in claim 6 further comprising an actuator and wherein the drive wheel resides in a space between consecutive rollers and wherein the actuator translates the drive wheel axially through the space from a first position in which the drive wheel engages one of the consecutive rollers to a second position in which the drive wheel engages the other of the consecutive rollers.

13. A conveyor as in claim 6 wherein the drive wheel has a gear on opposite side walls of the drive wheel.

14. A conveyor as in claim 1 wherein the pusher comprises a pusher belt coupled to the drive wheel and having an article-contacting face perpendicular to the conveying surface of the conveyor belt.

15. A conveyor as in claim 14 wherein the guide further includes a drive pulley driven by the drive wheel and driving the pusher belt.

16. A conveyor as in claim 14 comprising a geared engagement between the drive wheel and the drive pulley.

17. A conveyor as in claim 16 wherein the geared engagement has a gear ratio that causes the pusher belt to advance at a speed different from the speed of the conveyor belt.

18. A guide for articles on a conveyor belt, the guide comprising:
- a frame having a top and a bottom;
- a plurality of wheels extending below the bottom of the frame, wherein at least one of the wheels is a drive wheel;
- a pusher drivingly engaged by the drive wheel and forming a side of the guide;
- wherein the plurality of wheels are adapted to ride on the conveying surface of a conveyor belt to support the frame and rotate as the conveyor belt advances and wherein the rotation of the drive wheel actuates the pusher to push conveyed articles along the conveying surface of the conveyor belt.

19. A guide as in claim 18 wherein all the plurality of wheels are drive wheels.

20. A guide as in claim 18 wherein all the plurality of wheels are mounted on a common axle.

21. A guide as in claim 18 wherein the pusher comprises a plurality of rollers mounted in the frame for rotation on parallel axes that intersect the conveying surface of the conveyor belt.

22. A guide as in claim 21 wherein the guide includes a plurality of parallel axles, each of the axles supporting at least one of the rollers between the top and the bottom of the frame.

23. A guide as in claim 21 further comprising a geared engagement between the drive wheel and the plurality of rollers.

24. A guide as in claim 23 wherein the geared engagement has a gear ratio that causes the rollers to rotate at the point of contact with conveyed articles at a speed different from the speed of the conveyor belt in the direction of belt travel.

25. A guide as in claim 21 wherein the plurality of rollers have peripheries made of a high-friction rubber or elastomeric material.

26. A guide as in claim 21 further comprising an actuator and wherein the drive wheel resides in a space between consecutive rollers and wherein the actuator translates the drive wheel axially through the space from a first position in which the drive wheel engages one of the consecutive rollers to a second position in which the drive wheel engages the other of the consecutive rollers.

27. A guide as in claim 18 wherein the drive wheel has a gear on opposite side walls of the drive wheel.

28. A guide as in claim 18 wherein the pusher comprises a pusher belt coupled to the drive wheel.

29. A guide as in claim 28 wherein the guide further includes a drive pulley driven by the drive wheel and driving the pusher belt.

30. A guide as in claim 28 comprising a geared engagement between the drive wheel and the drive pulley.

31. A guide as in claim 30 wherein the geared engagement has a gear ratio that causes the pusher belt to advance at a speed different from the speed of the conveyor belt.

* * * * *